INVENTOR:
RICHARD C. WEBB

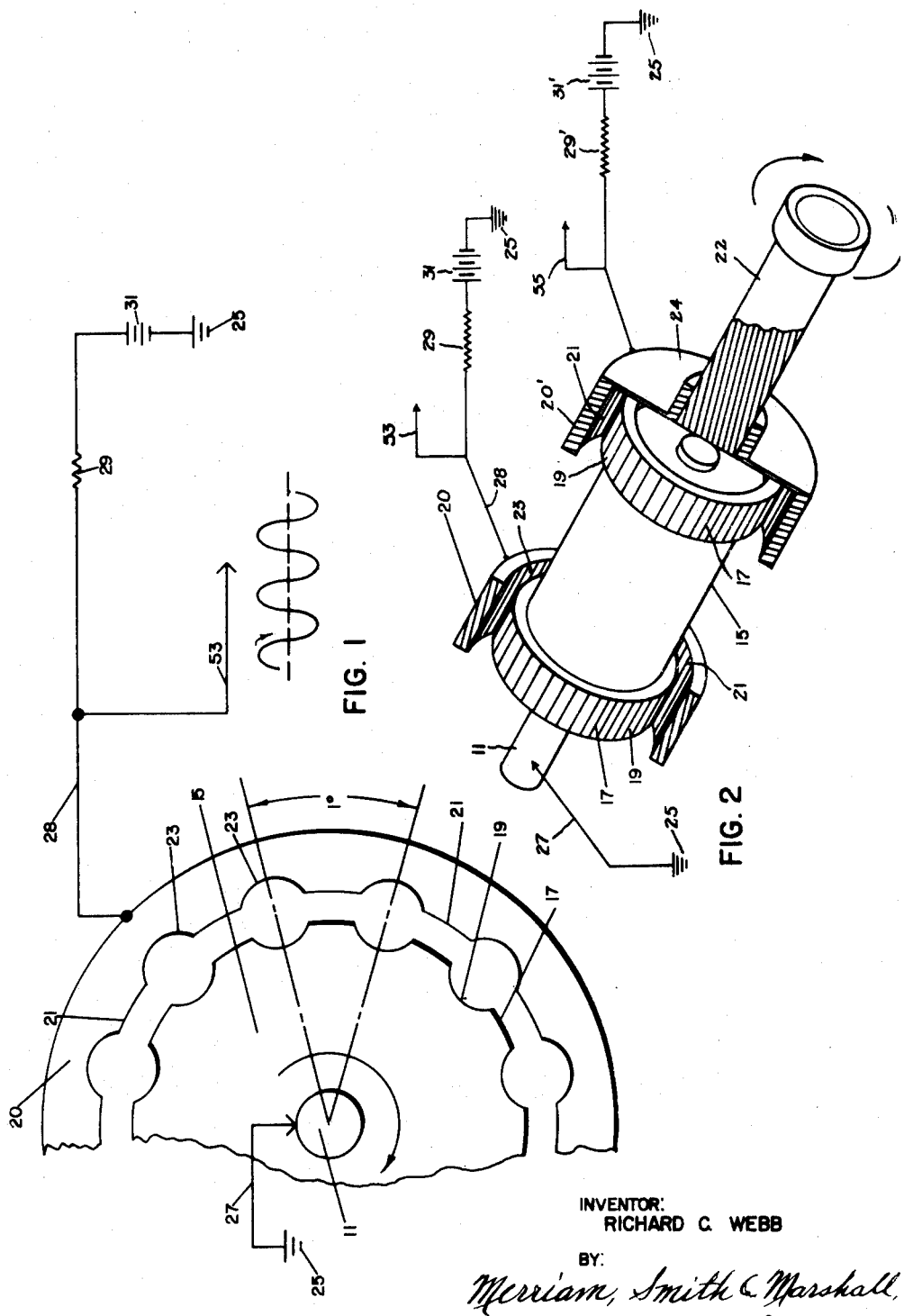

INVENTOR:
RICHARD C. WEBB
BY: Merriam, Smith & Marshall
    Attorneys

United States Patent Office 3,206,616
Patented Sept. 14, 1965

3,206,616
**PHASE COINCIDENCE DETECTOR
CONTROL CIRCUIT**
Richard C. Webb, Broomfield, Colo., assignor, by mesne assignments, to International Telephone and Telegraph Corporation, New York, N.Y., a corporation of Maryland
Original application Mar. 4, 1959, Ser. No. 797,264, now Patent No. 3,152,324, dated Oct. 6, 1964. Divided and this application Jan. 8, 1963, Ser. No. 250,184
13 Claims. (Cl. 307—88.5)

This is a division of application Serial No. 797,264, filed March 4, 1959, and now Patent No. 3,152,324.

This invention relates to apparatus and circuitry for providing a continuous measurement and digital encoding of the relative phase difference between two substantially sinusoidal electrical signals of equal frequency but variable phase angle.

In its preferred form the invention finds a principal application in the digital encoding of the relative phase difference between two electrical signal waves generated under the control of a precision electrostatic shaft-position-transducer which may be, illustratively, of the form described by this applicant in United States patent application, Serial No. 78,853, filed April 17, 1956, and issued as Patent No. 2,930,033 on March 22, 1960.

This application is directed particularly to the control circuitry by which the improved operation is achieved.

The transducer in its preferred form is a generator of two sinusoidal electrical signals of known and selected frequency, normally identical and one of which is of reference phase while the other adjusts to an advanced or retarded phase position in proportion to angular movements imparted to the mechanical shaft. Some phase measuring devices of the above type are designed to produce an electrical phase shift of precisely 360 electrical degrees for each mechanical degree of mechanical movement. By this invention a continuous electronic phase angle encoder is used in conjunction with an angle transducer to provide an apparatus by which angular positions of a shaft are interpreted in terms of digital signals with an accuracy considerably greater than that achieved by methods heretofore known or suggested.

The techniques embodied in this invention avoid the need for sampling of the analog information to be encoded into digital form, as is common in many analog-to-digital encoding schemes, so that the digital information is continuously available from the electronic apparatus and there is no delay entailed in the acquisition of information, as has been inherent in encoders of earlier designs.

According to the principles of this invention a large number of applications for shaft encoding apparatus of high precision manifest themselves. Such applications, by way of example, may be in the continuous measurement of azimuth and elevation shafts in optical tracking instruments and radars employed in guided missile range instrumentation; the measurement of angular displacements of stable platforms; the registration of angular settings of rotary tables used in machine tool applications, as well as many other applications that will suggest themselves to those skilled in the art to which the invention is directed.

The broad principle involved in the electrical phase angle measuring disclosed by the invention herein to be set forth is that of first relating each of the two signals whose relative phase is to be measured to selected harmonics of sufficiently high order to permit the harmonic frequencies to be used as a time measuring scale of fractional portions of the basic or fundamental signals.

In accordance with the invention, and that preferred form of it herein to be particularly discussed, the one-thousandth harmonic of a given wave is used as a scale, which permits making measurements to a least count or granularity of $\frac{1}{1000}$ of a wavelength or 0.360 electrical degree. As the invention will herein be described, each of the two basic signals is related to a selected harmonic of the same order (the one-thousandth harmonic, for example) and these harmonic signals are applied to a summing circuit wherein they are permitted to interfere constructively and destructively (additively and subtractively) with one another in accordance with movements or shifts in the relative phase position of the basic signals. In a case where the related signals are chosen as the one-thousandth harmonics, one thousand interference maxima and minima will occur as the basic electric waveforms are shifted in phase by one wavelength. If this amount of electrical shift is produced by a shaft position transducer due to rotation through one mechanical degree, then a summation of interference maxima is a measure to one-thousandth part of a mechanical degree or increments of 3.6 sec. of arc.

In the event the mechanical shaft is rotated first in one direction and then in the other, that is, for instance, clockwise and counter-clockwise, it becomes necessary to register the number of "up" counts (as for an increasing phase change) as well as the number "down" counts (as, for instance, for a decreasing phase change) to maintain the latest information concerning the shaft setting. One part of this invention, which is particularly set out by a divisional application Serial No. 250,186 of this application, filed January 8, 1963, relates to an "up-down" separator which functions in conjunction with the interference detector to transmit a series of "up" counts over a signal channel to a digital counter, as well as a series of "down" counts over another signal channel to the same counter, the counter being one of a type adapted to be advanced by "up" counts and retarded by "down" counts, thereby retaining at all times a "net" count at any given instant. This part of the broad invention will not be dealt with here in further detail.

With the foregoing in mind it becomes apparent that one of the many objects of the invention is that of providing for substantially continuously exhibiting and recording as measured values of great detail indications of certain electrical phenomena not otherwise readily comparable.

A further object of the invention is that of providing indicating apparatus which furnishes a continuous decimal display of measured angles in degrees and minute fractional parts thereof in an angle measuring assembly.

A further object of the invention is that of providing two electrical factors of substantially like frequency but variable phase, where the phase displacement is made substantially instantaneously available, so that measurement provided by an electronic system serves to quantize and encode the phase angle produced between the two generated or provided electrical waves and to present their form as a decimal fraction of a detail represented by an arcuate displacement of the order of 3 seconds of arc.

Other objects of the invention are to provide electronic vernier measurements of phase angle differences between two produced electrical waves where the comparison is substantially insensitive to amplitude variations in the generated and compared waves.

A further object of the invention is that of providing indications of immediate availability of whether or not the phase relationship between a reference or standard wave and one to be measured is lagging or leading with respect to the other, or whether or not there is precise coincidence between the two conditions.

Other and further objects of the invention are those of providing an angle and encoding system or device of high precision, which is generally self-calibrating, extremely light in weight, requiring minimum service, as well as space requirement and from which a readout accuracy of at least one part in almost one-half million is realizable.

Other and further objects of the invention are those of providing a variety of readout alternatives in an angle and encoding system where both decimal and binary decimal representations may be had and where, in the production of the representations, automatic resets can be had.

Other and further objects of the invention will, of course, be recognized as those of obtaining a high degree of accuracy, a high degree of insulation, a continuity of readout time, a general insensitiveness to temperature changes, a lightness of weight, a high efficiency and general freedom from complex circuitry in apparatus and circuitry of the foregoing type so that the marketing price can be at a minimum.

Other and further objects and advantages of the invention will become apparent and at once suggest themselves to those skilled in the art to which the invention is directed in the following description as considered particularly in connection with the accompanying drawings wherein;

FIG. 1 is a schematic diagrammatic view depicting in elementary form a form of electrostatic tone generating apparatus providing one form of arrangement in electro-mechanical transducer to develop each of a standard or reference frequency and a variable phase frequency for comparison with the standard;

FIG. 2 is an isometric view of the electro-mechanical transducer to indicate one mechanism to introduce phase shifts between two developed electrical waves;

Figure 3:
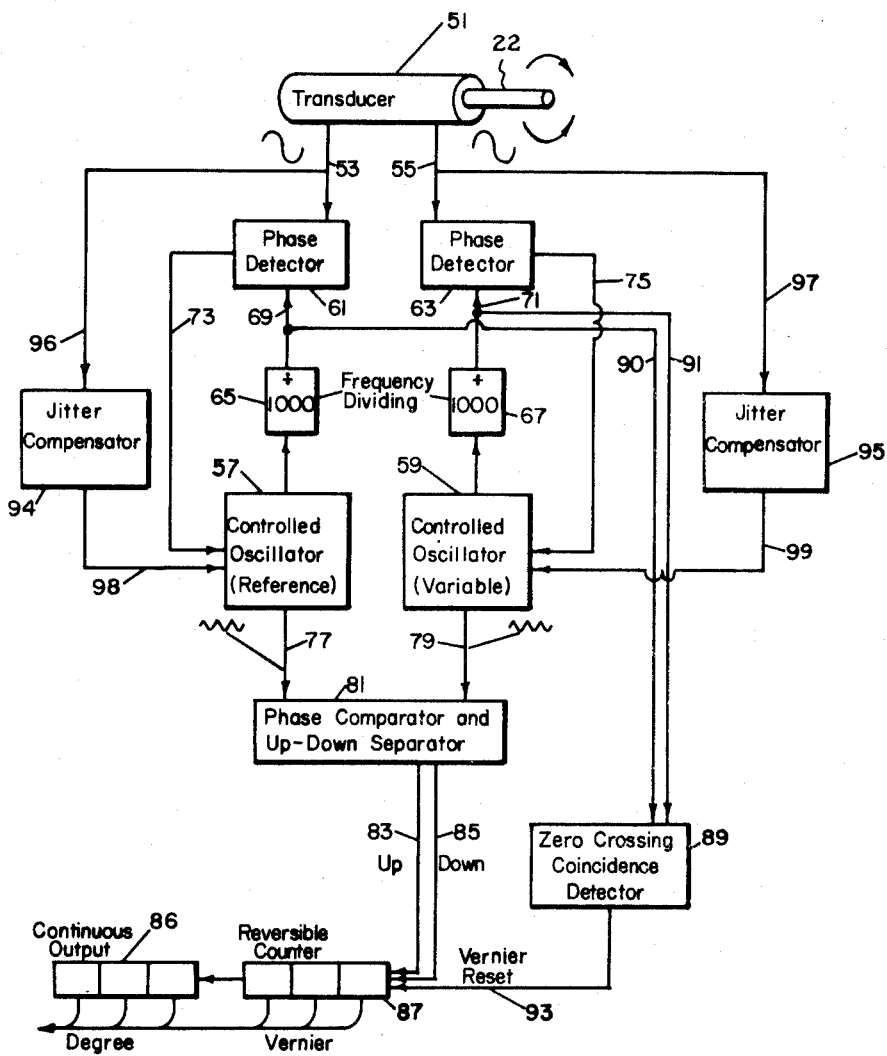
FIG. 3 is a diagrammatic view presented to show in block diagram form the component parts comprising a preferred form of the apparatus herein to be described.

For the purpose of illustrating the present invention in one of its aspects it will be assumed, for instance that an electro-mechanical transducer provides the wave generating mechanism. This transducer has a driven shaft element 11 which is turned continuously and uniformly at constant speed by means of a suitable driving motor (not shown but connected in any desired way to drive the shaft 11). The motor is supplied with input motive power from any desired source (not shown) connected to it in well known fashion. Carried upon the shaft 11 are a plurality of rotor elements 15 provided at their outer peripheral edge with teeth elements 17 which are separated from each other by slots or recesses 19. The teeth are formed usually by engraving the slots or recesses on the periphery of the surface of the rotor so that the unengraved portions represent the teeth. Illustratively, the rotor periphery may have uniformly spaced thereabout 360 teeth separated by a like number of slots. Each tooth is thus spaced from each adjacent tooth by one degree intervals on centers. Thus, for simplicity of reference and explanation of workings of one form of this apparatus, reference may be made to what may be regarded as a 360 degree device.

The stator elements 20 and 20' each have a similar number of teeth 21 and likewise a similar number of recesses or slots 23, separating these teeth. The inner diameter of the circular component formed by the stators 20 or 20' is made just slightly larger than the outer diameter of the rotor element and the teeth 17 so that with the rotor elements positioned to turn within the appropriate stator a very small air gap exists between the teeth 17 and 21 when these are brought as close to each other as possible.

The rotor element 15 is connected to ground or to a source of fixed potential 25 by way of the indicated conductor 27 and the brush or slip-ring on the shaft 11. Electrical connection is made to the stator 20 through the conductor 28 which connects to ground 25 through the charging resistor 29 and the source 31. The stator element is thus maintained insulated from ground 25 and, with rotation of the rotor element 15 the varying capacitance between it and the stator element 20 is supplied with charging current from the source 31 through the resistor 29. The rotation of the rotor element causes the teeth of the stator successively to be aligned with the rotor teeth and to be separated from the rotor teeth producing charging of the condenser to a potential determined by the capacity between the rotor and the stator teeth elements. Variation in capacitance due to rotation of the rotor then induces a corresponding change of the charging current fom the source and produces across the resistor 29 a voltage which becomes available on the conductor 53. This wave may have the form of that wave indicated immediately beneath the conductor. A like frequency wave is generated by the rotor-stator combination 19, 20' with the output wave available on conductor 55. Primed numbers in FIG. 2 represent components like those described in producing the waveform available on conductor 53 of FIG. 1.

When the rotor element is provided with two sets of teeth, as in FIG. 2, both are carried upon the shaft 11 and each is positioned adjacent to the other, and each is adapted to rotate relative to its own related stator element so that it becomes apparent that two separate 5.4 kc. per second waves are developed and available on conductors 53 and 55.

In applying the invention to apparatus for encoding interference effects which constitute a measure of angular departures of one element relative to another the driven elements, such as the rotors 15 are caused to turn relative to a pair of stator elements 20 and 20'. One of the stator elements, such as element 20, remains in fixed position at all times and the other is adjustable. The adjustable stator element 20' is subject to being changed in its angular position relative to the rotor with the changes resulting from induced mechanical turnings of a controllable component, such as the conventionally represented control shaft 22 (FIG. 2). In each instance the rotor elements revolving internally of the stator elements 20 and 20', produce output electrical waves of substantially sinusoidal form whose frequency is substantially identical, although the phase of the generated waves produced by the rotor-stator combination which is adjustable is subject to change relative to the reference frequency from the other wave-generating component. In this sense the phase may be advanced or retarded relative to the reference phase.

In practicing the invention the element whose angular state is to be determined is rotated (as indicated by the arrow in FIG. 2) to turn the shaft 22 and with it the hub 24 and stator 20'. This introduces a phase change in the waveform available on conductor 55 as compared to that available on conductor 53. This change is then precisely determined.

By FIG. 3 of the drawings a generalized schematic view of the complete invention is set forth. As shown, the transducer element 51 when rotated produces the reference and variable phase electrical waves. For indicating the fact that the variable phase generated wave may either be retarded or advanced with respect to the reference the rotary transducer is shown as capable of revolving in either a clockwise or counter-clockwise direction, as designated by the arrows adjacent to the shaft 22 in each of FIGS. 2 and 3. Output voltages of a waveform substantially like those forms shown adjacent to the transducer are provided on the conductors 53 and 55, the waveforms on the conductor 53 for reference purposes being considered as developed from the combination of the permanently fixed stator 20 and its rotor 15 with teeth 17 and those waveforms developed on the conductor 55 being considered to have been developed by the relative change between rotor 15 and its teeth 17 relative to the stator element 20', the relationships, of which are adjustable with respect to each other, as already explained. The frequency of the output voltages on conductors 53 and 55 may be chosen at any value desired, although it will be understood that the chosen generated frequency is determined by the number of separate pole pieces on the rotor and stator elements and the speed of rotation of the elements. For instance, if each rotor and stator is provided with 360 teeth and the rotor is turned in the shaft 11 relative to the stator at a speed of 900 r.p.m. the output frequency on conductors 53 and 55 will be of sine-waveform repeating at a frequency of 5.4 kc. Concurrently with the generation of the reference and variable phase voltages at the assumed frequency, which is here given solely by way of example to provide an illustration of one form of the operation of the apparatus and circuitry herein to be set forth, there is generated in the conventionally indicated generators 57 and 59 for the reference and variable frequency panels respectively oscillations which occur at a harmonic of the frequency developed from the transducer.

The oscillators 57 and 59 are not shown by circuit components since these are of any form well known in the art. One form of the oscillator which has proved quite satisfactory is the well-known Colpitts-type which provides extremely stable operation. The generated frequency is, however, subject to control, as desired, in well-known fashion. The reference and variable phase output voltages are developed and available along the conductors 53 and 55 from which they are supplied to suitable phase detectors 61 and 63, the character of which is well known and need not be described herein in detail. Suffice it to say that the phase comparison of voltages is made between a sub-harmonic of the reference and variable master oscillator frequency as supplied to the phase detectors from frequency dividers 65 and 67 through conductors 69 and 71.

The frequency dividers 65 and 67 are of any well-known type suitable for providing a frequency division. In the illustrated case a frequency division of one thousand has proved satisfactory so that in the phase detectors 61 and 63 a phase comparison is made between the master control oscillator at its one-thousandths sub-harmonic and the developed generated frequency. The technique followed in this phase detector is essentially similar to that adopted in the well-known form of television circuitry wherein the so-called fly wheel type of synchronization is established. Any phase differences between the frequency of the waveform applied via the conductors 69 and 53 to the phase detector 61 or via the conductors 71 and 55 to the phase detector 63 will then manifest themselves as a suitable control voltage available respectively on the conductors 73 and 75 which then may be supplied as a D.C. control voltage, for instance, which is fed back to control and adjust the frequency of the oscillators 57 and 59, respectively. This control may be provided in well-known manner, such as by applying the phase-detected voltage as a gain control signal for the usual form of reactance tube whose output controls the magnitude of either an inductive or capacitive component in the oscillatory circuit of the oscillators 57 or 59, depending upon which form of signal channel is to be selected. In this way an automatic frequency control loop is established between the oscillators 57 and 59 and the voltages developed on the conductors 53 and 55 through the action of the phase detectors 61 and 63, as the case may be.

Output voltages from the oscillators 57 and 59 comprising the master and variable control voltages occurring at a harmonic frequency of that developed by the transducer are also supplied by way of conductors 77 and 79 to a phase comparator and co-called up-down separator 81, which has been shown in block form on the schematic diagram of FIG. 3 but which circuitry is further outlined and described in the parent application hereinabove identified. Suffice it for the purposes of this application to state that in the phase comparator and up-down separator 81 output signal voltages of general pulse characteristics are provided and appear on the output conductors 83 and 85 as pulses to be added or subtracted in a reversible counter mechanism. The counters are shown conventionally by the counter components 86 and 87 which each comprise a plurality of separate indicator tubes and of which respectively and for illustrative purposes may be considered as representing degrees of phase shift by the counter 86 and tens, hundreds and thousands of degrees by the counter, schematically represented at 87 and thus forming a so-called vernier counter. The counter itself is in the form of a tube which has become known in the art as a Burroughs-tube and illustratively may be of that form known as the BD301. Each output pulse available on the conductors 83 or 85 and indicative of either an add or subtract pulse is, accordingly, effective to move the counted indication on the counter vernier up or down one step and thus register increasing or decreasing angle, and, of course, a phase change which is either increasing or decreasing. To illustrate, and still assuming the specific values here depicted, it will be appreciated that if the reference phase oscillator 57 operates at a normal 5.4 mc. and the variable phase oscillator 59 responds to changes in the variable phase input signal to maintain one thousand cycles for every transducer cycle, if the transducer input 55 is turned one mechanical degree thus changing the relative position of one stator tooth relative to a rotor tooth, the variable phase oscillator 59 will generate one thousand cycles more than the reference phase oscillator 57. Likewise, if the angular relationship is changed one mechanical degree clockwise the variable phase oscillator 59 will generate one thousand cycles less than the reference oscillator 57. By the same token, if the input to the transducer is rotated at constant velocity of one degree per second in a clockwise direction, for instance, the output of the variable phase from the transducer will be 5.401 kc. and the variable phase oscillator 59 will then be forced by the controlled voltage to operate at 5.401 mc. which is 1000 cycles per second faster than the reference phase oscillator. Since the signals from both the reference phase oscillator 57 and the variable phase oscillator 59 are applied by way of conductors 77 and 79 to the phase comparator and up-down separator, it will be appreciated that as the variable phase oscillator output moves one cycle with respect to the reference phase oscillator, the phase comparator goes through one null and one re-enforcement. In case the variable phase oscillator tends to operate faster than the reference oscillator there is produced in the output of the phase comparator and up-down separator 81 on the conductor 83 an "up" count for each passing cycle. It follows that if the variable phase oscillator tends to operate slower than the reference oscillator a "down" count or a pulse is produced on the conductor 85 for each passing cycle. If there is a frequency change which is common to both phases no so-called "up" and "down" counts are produced. Consequently, the effects of small power line frequency changes or hunting conditions to the drive motor are cancelled.

It is desirable to reset the vernier counter 87 to a zero state whenever absolute coincidence is achieved between the variable and reference phase signals at the assumed 1000:1 frequency dividers 65 and 67. The resetting is achieved under the control of the zero crossing coincidence detector conventionally shown at 89 in FIG. 3. In practice the signals serving to control the zero crossing coincident detector 89 are fed by way of the input conductors 90 and 91, these representing, illustratively, an input determined by the reference and variable phase oscillators 57 and 59 reduced in frequency by an order of 1000. The input signal supplied by way of the conductors is generally in pulse form and serves to provide a zero position indication once each cycle. The output signals from the zero crossing coincidence detectors 89 which control the vernier counter 87 then appear on the conductor 93.

The continuous output counter section 86 is controlled by means of a code plate assembly (not shown), operated in conjunction with the transducer. The code plate assembly is known in the art and provides a control which is indicative of a continuous output of the correct degree information. Control is effected through a brush selecting gate (not shown) which is controlled from the hundreds decade of the up-down counter which determines the selection of a leading or lagging brush in the code plate system. For instance, as is known in the art, for a digit of 0 through 4 in the hundreds counter a leading brush is energized and for a digit 5 through 9 a lagging brush is energized. The code plates then produce a binary coded decimal form of continuous output of the correct degree information and there is no ambiguity in the degree crossovers because the vernier counter 87 is continuously selecting the correct brush to go with the prevailing vernier indicator or reading. This form of control of the output is known and, is therefore, not specifically diagrammed by FIG. 3.

One form of circuitry to provide for compensating for fluctuations due to mechanical imperfections unavoidable at times in apparatus such as that shown by FIG. 2 has been schematically represented in FIG. 3 as the block diagram form of "jitter" corrector conventionally shown at 94 and 95. Input signals to the jitter correctors 94 and 95 are provided by way of conductors 96 and 97. Produced correction signals from the compensators 94 and 95 are then supplied by way of conductors 98 and 99, respectively, to the input of the oscillators 57 and 59. The jitter corrector is described and discussed in further detail in the parent application and by concurrently filed divisional application Serial No. 250,185. Suffice it to state, therefore, at this point that signal voltage is developed in the compensators 94 and 95 which is provided for the purpose of initiating a very minor phase modulation of the oscillator 57 or 59, as the case may be, in order to compensate the phase error in the control of the oscillator.

Figure 4:
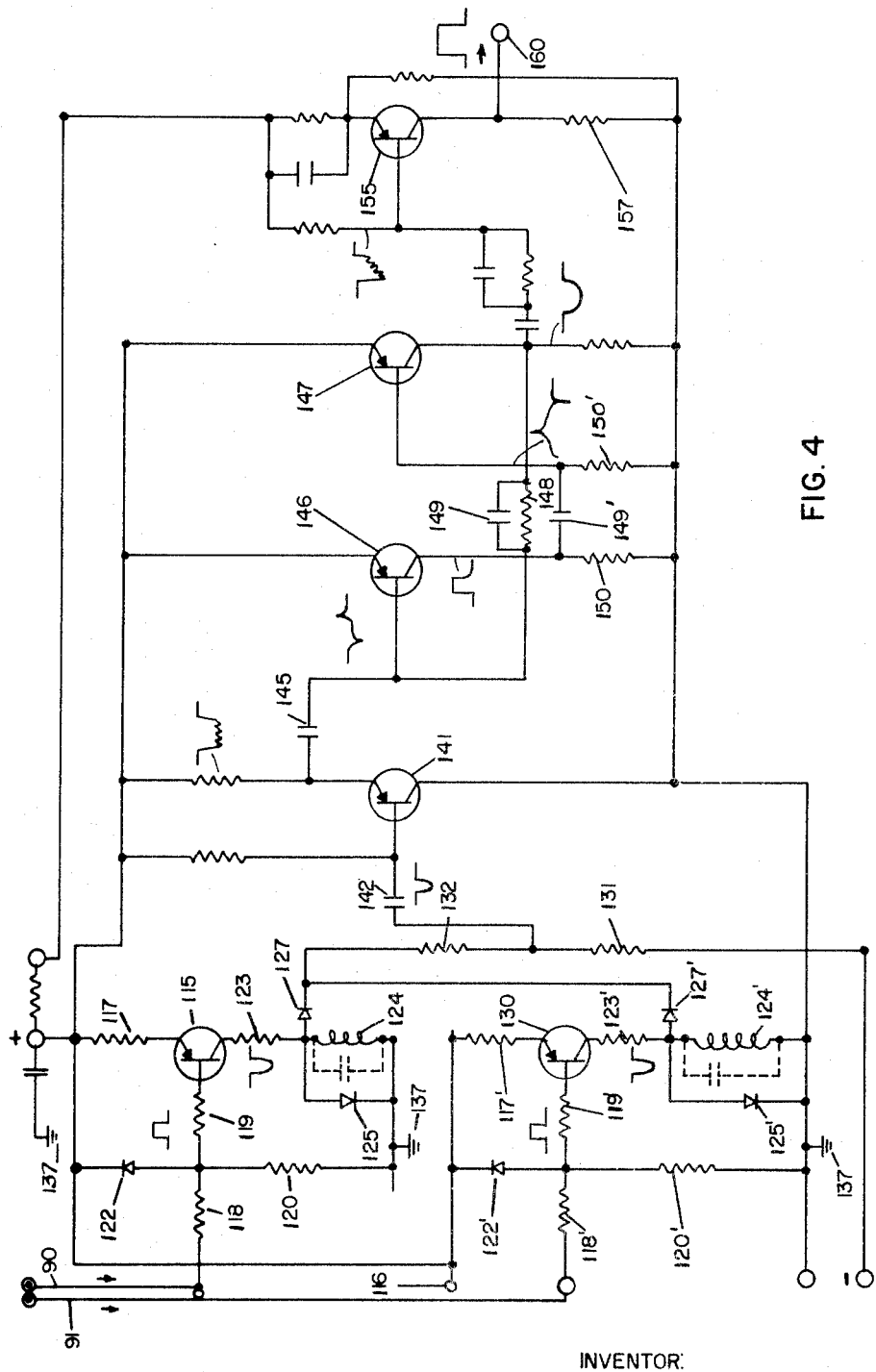
FIG. 4 is an illustration of one form of circuit for use with the components depicted by FIG. 3 and illustrating in particular one form of zero crossing coincidence detector.

In the particular control circuitry which is considered specifically by this application the zero crossing coincidence detector provided for a vernier reset is described generally in connection with the schematically indicated component 89 in FIG. 3. By FIG. 4 the pulse input voltage is available upon the conductors 90 and 91 and is of a waveform there generally depicted. These pulses are applied to the transistor circuits. The input pulse on the conductor 90 is applied to the base electrode of the transistor 115, to the emitter of which a positive biasing voltage of the order of 10 volts relative to ground potential may be applied from a suitable source (not shown), connected at the terminal point 116 and connected to the emitter through the resistor 117. The input voltage is applied through a pair of resistors 118 and 119 and across resistor 120 connected with one terminal to the junction of resistors 118 and 119 and with the other terminal connected to ground 137. Since the pulse applied along the conductor 90 is often of substantial amplitude, the diode 122 serves to limit the voltage that can be applied to the base and thus protects the transistor element.

The voltage applied by way of conductor 90, being in the form of positive pulses, causes current substantially instantaneously to cease flowing through the transistor 115 and the resistor 123 and inductor coil 124 to ground 137. Coil 124 is bypassed by a diode 125 in well-known fashion to damp any oscillations across the coil. The diode 125 may be of any suitable and known type but it has been found that a transistor, such as that shown at 115 may be a component of the 2N247 type with highly satisfactory functioning. With the cutting off by the pulse activation of the transistor 115, the inductance element 124 having the indicated shunt distributed capacity, breaks into oscillation with the inductor 124 and the distributed capacity providing a ringing circuit. The ringing effect is highly damped by the diode 125 (usually of the 1N67A type). The first negative pulse of the produced oscillation is less negative than the bias voltage applied to the cathode of diode 127 and hence is applied through the diode 127 (also of the same type) to be added to the output of a second transistor element 130, later to be described, and made available as an input or control signal across the resistor 131 and through resistor 132. The effective output is a pulse of the first negative half cycle of the pulse and of about a 0.2 microsecond duration. The positive half cycle is prevented from reaching the output by the diode 125.

Pulse voltage of the waveform available on the conductor 91 is applied to the transistor element 130 (again an element preferably of the 2N247 type) in a fashion similar to that already explained relative to the transistor 115, it being understood, of course, that the waveform on the conductor 90 will be assumed to represent the controlled reference oscillator and that available on the conductor 91 will represent the variable oscillator. Since the two portions of the circuit function in identical fashion, like parts are similar and are numbered with primed numbers and will not be discussed further.

It is safe to say that the output signals from transistor 130 combine with those of transistor 115 and add across resistor 131 to feed the "and" gate provided by transistor 141. Resistor 132 is normally adjusted for twice the maximum triggering voltage so that, when there is phase coincidence between the output pulses available on conductors 90 and 91, this pulse voltage will be supplied to the base of transistor 141 through the condenser 142. It will be seen that the transistor 141 (which is preferably one of the 6T761 type) is connected with the transistor 115 as an emitter follower. Such voltage as is available through the emitter-coupled transistor 141 is then supplied through the coupling condenser 145 to the transistors 146 and 147 (also preferably of the 6T761 type) connected as a delay multivibrator. The cross-connection between the two parts of the multivibrator is provided by the parallel combination of resistor 149' and the condenser 149 connecting the output of transistor 147 to the input of transistor 146. Similarly, the output of transistor 146 is connected to the input of transistor 147 through condenser 149'. The transistors 146 and 147, working together, function essentially as a "one-shot" multivibrator whose period is controlled by the time constant established for the circuit by the appropriate choice of the condenser 149' and the resistor elements 150 and 150'. The signal pulse output from the transistor delay multivibrator is then amplified and inverted by the transistor 155 (usually a 2N192 type), the output of which is obtained from the collector across the resistor 157 and made available at the output terminal 160, from there to be applied, illustratively, to control some suitable form of control device which may be of any desired character, such as a blocking oscillator, to reset the counter mechanism in accordance with the conditions instantaneously obtaining.

Where a blocking oscillator (not shown) is used as a reset circuit it usually functions in combination with a suitable up-down circuit which need not here be described. The control is generally well known as a form of control for an indicator tube of the add or subtract type, such as the Burroughs-tube type BD301. The operation is such that all electrodes of the tube are carried to a state that the beam developed within the tube is blanked and then finally, following a short time interval on the reset phase, the tube is again driven to an operating state with the indication produced at a zero marker thereon.

At that point it may be restated that the up-down counter chassis preferably comprises three decade up-down counters. This chassis usually also includes certain plug-in printed circuit boards which contain diode matrices as well as the drive circuit for degree acquisition of the code plate system which has been generally referred to herein and which, it will be recalled, serves to control the continuous output of the degree counter 86, but which is generally auxiliary to the instant invention. In the up-down counter, it will be understood, that this has been shown merely diagrammatically since various forms of up-down counters are known and used in the art. Among the groups making and providing up-down counters which are suitable for use in connection with the present apparatus and which are suitable for controlling the operation of the already-described Burroughs-type BD301 registering tube, are counters made by the Victor Adding Machine Company of Chicago and counters made by Di/An Instrument Company of Boston, Massachusetts. Essentially the indicator tubes of the suggested types are connected in a complementary fashion so that the so-called "subtract" pulses function to produce indications on one of the tubes, and the so-called "add" pulses produce indications on the other tube. Other forms of the up-down counters and indicator components (tubes or other forms) well known to those skilled in the art may also be used and the schematic drawing herein is thus considered illustrative and not limiting. Suffice it, therefore, to say that the counter mechanism is controlled as schematically indicated and is used in connection with the other circuit components herein either specifically or diagrammatically set forth.

Many and varied modifications may be made to the circuitry here claimed and described. Therefore, it is believed that the claims hereinafter appended should be considered broadly and limited only insofar as prior art limitations necessitate it.

What is claimed is:

1. A coincidence detector circuit for controlling display apparatus as a function of phase coincidence comprising a pair of transistor elements, each of said transistor elements comprising an emitter electrode, a base electrode, and a collector electrode, means for applying pulse signals of selected frequency to the base electrode of one of said transistor elements, means for applying other pulse signals of substantially like frequency but subject to phase shift to the base electrode of the other transistor element, an output circuit for each of said transistor elements, including an inductive element, a signal combining circuit forming an "and" circuit connected to receive the signal outputs developed from each transistor element across the inductive elements, a third transistor element having an emitter electrode, a base electrode and a collector electrode, means for connecting the base electrode thereof to receive the combined output from the first two transistor elements, a load circuit connected to the emitter electrode of said third transistor element, and a damping unilateral conductor connected in shunt with each inductive element whereby interruptions of pulse inputs to each of the first pair of transistor elements introduces a ringing in the inductive element which is dampened by the unilateral conductor and a pulse input is supplied to the third transistor element during periods of coincidence of outputs of each of the first pair of transistor elements.

2. The circuit claimed in claim 1 wherein the unilateral conductor is a diode.

3. The circuit claimed in claim 1 comprising, in addition, means to limit the amplitude of the input signal pulse supplied to each of the pair of transistor elements.

4. The circuit claimed in claim 1 comprising, in addition, a "one-shot" multivibrator circuit connected to be triggered by the signal output of the third transistor element, and a lone transistor circuit connected to the multivibrator.

5. The circuit claimed in claim 1 comprising, in addition, a second pair of transistor elements, each of said transistor elements having an emitter electrode, a base electrode and a collector electrode, means for cross-connecting their base and collector electrodes, means for connecting the emitter electrode to a bias source of fixed potential, a time constant circuit included in each cross-connection to provide multivibrator operation therefrom, means to supply the output of the third transistor element to one of the cross-connected circuits to develop a pulse output from the said multivibartor, and amplifying means for amplifying the multivibrator output.

6. A coincidence detector control circuit for display apparatus comprising a pair of transistor elements, each of said elements comprising an emitter electrode and a collector electrode, an inductive element for connecting the collector electrode of each transistor to a common point of fixed potential, means for applying pulse signals of selected frequency to the base electrode of one transistor, means for applying other pulse signals of substantially like frequency but subject to phase shift to the base electrode of the other transistor, a common output circuit for the transistors connected across each inductive element, said common output circuit forming an "and" circuit, a third transistor element comprising an emitter electrode, a base electrode, and a collector electrode, means for connecting said last named base electrode to receive the common output from the first two transistors, said third transistor being emitter-coupled to the first pair of transistors and having its collector also connected to the point of fixed potential, a load circuit connected to the emitter output of said third transistor, and a damping unilateral conductor connected in shunt with each inductive element whereby transistor current interruptions by pulse inputs to each of the first pair of transistors introduces a ringing in the inductive element which is damped by the unilateral conductor and a pulse input is supplied to the third transistor during periods of coincidence of outputs of each of the first pair of transistors.

7. The circuit claimed in claim 6 wherein the unilateral conductor is a diode.

8. The circuit claimed in claim 6 comprising, in addition, means to limit the amplitude of the input signal pulse supplied to each of the pair of transistor elements.

9. The circuit claimed in claim 6 comprising, in addition, a pair of transistors, each of said second pair of transistors having an emitter electrode, a base electrode and a collector electrode, means for cross-connecting the base and collector electrodes, means for connecting the emitters to the bias source for the emitters of the first group of transistors, a time constant circuit included in each cross-connection to provide multivibrator operation therefrom, means to supply the output of the third transistor to one of the cross-connected circuits to develop a pulse output from the said multivibrator, and ampliyfing means for amplifying the multivibrator output.

10. A coincidence detector control circuit comprising a pair of transistors, each of said transistors having an emitter electrode, a base electrode and a collector electrode, means for applying a positive bias upon the emitter element of each transistor, an inductive element connected between the collector of each transistor and a point of fixed potential, an "and" circuit including a resistance having one terminal connected to the junction point of the connection of each inductive element and the associated transistor collector and the other terminal connected to a point of known potential, a third transistor having an emitter electrode, a base electrode and a collector electrode, means for connecting its base electrode to receive the output of the "and" circuit and its collector to a point of fixed potential, the said third transistor being emitter-coupled to the first pair of transistors, means to bias the last-named transistor to restrict current flow therethrough to a load circuit connected to the emitter of the said third transistor, means to supply separate input signal pulses upon the base electrodes on the first pair of transistors to produce current flow therethrough and, with interruptions in current flow, to induce oscillations across the inductive element connected with each transistor collector, and damping means to damp the developed oscillations subsequent to the first half-cycle developed across each inductive element whereby during periods of coincidence of the development of oscillations across the inductive elements control voltages are applied to the third transistor through the "and" circuit.

11. The circuit claimed in claim 10 wherein the damping means is a diode.

12. The circuit claimed in claim 10 comprising, in addition, means to limit the amplitude of the input signal pulse to each transistor.

13. The circuit claimed in claim 10 comprising, in addition, a second pair of transistors, each having an emitter electrode, a base electrode and a collector electrode, means for cross-connecting the base and collector electrodes, means for connecting the emitters to a source of positive bias, a time constant circuit included in each cross-connection to provide multivibrator operation therefrom, and means to connect the emitter electrode of the third transistor to the base of one of said pair of transistors to develop a pulse output from the collector electrode of the other of said pair of transistors.

No references cited.

ARTHUR GAUSS, *Primary Examiner.*